United States Patent
Fukumaru et al.

(10) Patent No.: US 9,843,273 B2
(45) Date of Patent: Dec. 12, 2017

(54) POWER CONVERSION APPARATUS, PHASE CURRENT DETECTION APPARATUS, AND PHASE CURRENT DETECTION METHOD

(71) Applicant: Kabushiki Kaisha Yaskawa Denki, Kitakyushu-shi (JP)

(72) Inventors: Shingo Fukumaru, Kitakyushu (JP); Shinya Morimoto, Kitakyushu (JP); Hideaki Iura, Kitakyushu (JP); Hirofumi Kinomura, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/252,410

(22) Filed: Aug. 31, 2016

(65) Prior Publication Data

US 2017/0063252 A1    Mar. 2, 2017

(30) Foreign Application Priority Data

Sep. 1, 2015 (JP) .................................. 2015-172342

(51) Int. Cl.
*H02M 7/5387* (2007.01)
*H02M 1/00* (2006.01)

(52) U.S. Cl.
CPC .. *H02M 7/5387* (2013.01); *H02M 2001/0009* (2013.01); *H02M 2007/53876* (2013.01)

(58) Field of Classification Search
CPC .. H02M 3/33507; H02M 3/315; H02M 3/335; H02M 7/525; H02M 7/48; H02M 7/515; H02M 7/537; H02M 7/521; H02M 7/5387; H02M 7/53871

USPC ... 363/78, 79, 80, 95, 97, 98, 131, 132, 137
See application file for complete search history.

(56) References Cited

U.S. PATENT DOCUMENTS

| | | | | |
|---|---|---|---|---|
| 5,262,935 | A | * 11/1993 | Shirahama | ................ H02J 3/46 363/37 |
| 5,631,819 | A | * 5/1997 | Masaki | ............. H02M 7/53873 318/811 |
| 2003/0020428 | A1* | 1/2003 | Masaki | ..................... H02P 6/18 318/727 |
| 2014/0125261 | A1* | 5/2014 | Yamazaki | ........... H02P 21/0039 318/400.02 |

(Continued)

FOREIGN PATENT DOCUMENTS

JP    2010-088260 A    4/2010

*Primary Examiner* — Adolf Berhane
(74) *Attorney, Agent, or Firm* — Oblon, McClelland, Maier & Neustadt, L.L.P.

(57) ABSTRACT

A power conversion apparatus includes: a power converter that includes a plurality of switching elements; a switch controller that controls the plurality of switching elements so that the order of outputting a plurality of kinds of voltage vectors from the power converter is opposite in a first half and a latter half of a carrier period; a DC-side current detector that detects a DC-side current of the power converter; and a phase current detector that detects one phase current among three phase currents on the basis of the detected DC-side current at a detection timing, the detection timing being selected from a first-half timing and a latter-half timing of the carrier period at which the same kind of voltage vector is output. The phase current detector includes a timing switcher that alternately switches the detection timing between the first-half timing and the latter-half timing.

20 Claims, 11 Drawing Sheets

(56) References Cited

U.S. PATENT DOCUMENTS

| | | | | |
|---|---|---|---|---|
| 2014/0292237 A1* | 10/2014 | Yamazaki | ............... | H02P 6/183 |
| | | | | 318/400.02 |
| 2014/0346984 A1* | 11/2014 | Shiota | ..................... | H02P 6/183 |
| | | | | 318/400.02 |
| 2015/0069941 A1* | 3/2015 | Iwaji | ......................... | H02P 6/18 |
| | | | | 318/400.11 |
| 2016/0020708 A1* | 1/2016 | Nakagawa | ........ | H02M 7/53875 |
| | | | | 363/131 |
| 2017/0063253 A1* | 3/2017 | Fukumaru | ............... | H02P 21/13 |

* cited by examiner

FIG. 2

| FUNDAMENTAL VOLTAGE VECTOR | Sup | Svp | Swp | BUS BAR CURRENT $i_{dc}$ |
|---|---|---|---|---|
| $V_1$ | 1 | 0 | 0 | $i_u$ |
| $V_2$ | 0 | 1 | 0 | $i_v$ |
| $V_4$ | 0 | 0 | 1 | $i_w$ |
| $V_6$ | 0 | 1 | 1 | $-i_u$ |
| $V_5$ | 1 | 0 | 1 | $-i_v$ |
| $V_3$ | 1 | 1 | 0 | $-i_w$ |
| $V_0$ | 0 | 0 | 0 | — |
| $V_7$ | 1 | 1 | 1 | — |

| PHASE θv | REGION | FUNDAMENTAL VOLTAGE VECTOR FOR REGION |
|---|---|---|
| $0 \leq \theta v < 60$ | 1 | $V_1, V_3$ |
| $60 \leq \theta v \leq 120$ | 2 | $V_2, V_3$ |
| $120 < \theta v \leq 180$ | 3 | $V_2, V_6$ |
| $180 < \theta v < 240$ | 4 | $V_4, V_6$ |
| $240 \leq \theta v \leq 300$ | 5 | $V_4, V_5$ |
| $300 < \theta v < 360$ | 6 | $V_5, V_1$ |

FIG. 7

| VOLTAGE PHASE | REGION | VOLTAGE VECTOR PATTERN |
|---|---|---|
| $0 \leq \theta v < 60$ | 1 | $V_0 \rightarrow V_1 \rightarrow V_3 \rightarrow V_3 \rightarrow V_1 \rightarrow V_0$ |
| $60 \leq \theta v < 120$ | 2 | $V_0 \rightarrow V_2 \rightarrow V_3 \rightarrow V_3 \rightarrow V_2 \rightarrow V_0$ |
| $120 \leq \theta v < 180$ | 3 | $V_0 \rightarrow V_2 \rightarrow V_6 \rightarrow V_6 \rightarrow V_2 \rightarrow V_0$ |
| $180 \leq \theta v < 240$ | 4 | $V_0 \rightarrow V_4 \rightarrow V_6 \rightarrow V_6 \rightarrow V_4 \rightarrow V_0$ |
| $240 \leq \theta v \leq 300$ | 5 | $V_0 \rightarrow V_4 \rightarrow V_5 \rightarrow V_5 \rightarrow V_4 \rightarrow V_0$ |
| $300 < \theta v < 360$ | 6 | $V_0 \rightarrow V_1 \rightarrow V_5 \rightarrow V_5 \rightarrow V_1 \rightarrow V_0$ |

FIG. 8

| REGION | DETERMINATION CONDITION | CALCULATION FORMULA |
|---|---|---|
| 1 | $v_\alpha^* \geq 0$, $v_\beta^* \geq 0$, $v_{\alpha\beta}^{**} > 0$ | $i_u = i_{dc1}$<br>$i_v = -i_{dc1} - (-i_{dc2})$<br>$i_w = -i_{dc2}$ |
| 2 | $v_\beta^* \geq 0$, $v_{\alpha\beta}^{**} \leq 0$ | $i_u = -i_{dc1} - (-i_{dc2})$<br>$i_v = i_{dc1}$<br>$i_w = -i_{dc2}$ |
| 3 | $v_\alpha^* < 0$, $v_\beta^* \geq 0$, $v_{\alpha\beta}^{**} > 0$ | $i_u = -i_{dc2}$<br>$i_v = i_{dc1}$<br>$i_w = -i_{dc1} - (-i_{dc2})$ |
| 4 | $v_\alpha^* < 0$, $v_\beta^* < 0$, $v_{\alpha\beta}^{**} > 0$ | $i_u = -i_{dc2}$<br>$i_v = -i_{dc1} - (-i_{dc2})$<br>$i_w = i_{dc1}$ |
| 5 | $v_\beta^* < 0$, $v_{\alpha\beta}^{**} \leq 0$ | $i_u = -i_{dc1} - (-i_{dc2})$<br>$i_v = -i_{dc2}$<br>$i_w = i_{dc1}$ |
| 6 | $v_\alpha^* \geq 0$, $v_\beta^* < 0$, $v_{\alpha\beta}^{**} > 0$ | $i_u = i_{dc1}$<br>$i_v = -i_{dc2}$<br>$i_w = -i_{dc1} - (-i_{dc2})$ |

FIG. 9

| CURRENT REGION | PREVIOUS REGION | | | | | |
|---|---|---|---|---|---|---|
| | 1 | 2 | 3 | 4 | 5 | 6 |
| 1 | -1 | 1 | 1 | -1 | 1 | -1 |
| 2 | 1 | -1 | -1 | 1 | -1 | 1 |
| 3 | 1 | -1 | -1 | 1 | 1 | -1 |
| 4 | -1 | 1 | 1 | -1 | -1 | 1 |
| 5 | 1 | -1 | 1 | -1 | -1 | 1 |
| 6 | -1 | 1 | -1 | 1 | 1 | -1 |

POWER CONVERSION APPARATUS, PHASE CURRENT DETECTION APPARATUS, AND PHASE CURRENT DETECTION METHOD

CROSS-REFERENCE TO RELATED APPLICATION

This application claims priority from Japanese Patent Application No. 2015-172342 filed with the Japan Patent Office on Sep. 1, 2015, the entire content of which is hereby incorporated by reference.

BACKGROUND

1. Technical Field

Embodiments to be disclosed herein relate to a power conversion apparatus, a phase current detection apparatus, and a phase current detection method.

2. Description of the Related Art

A known power conversion apparatus (for example, JP-A-2010-088260) includes a power converter performing power conversion between DC power and three-phase AC power. In this power conversion apparatus, the DC-side current of the power converter is detected. On the basis of the detected DC-side current, the three phase currents are detected.

In this power conversion apparatus, the DC-side current of the power converter is detected at a plurality of timings at which a plurality of different voltage vectors is output from the power converter. On the basis of this DC-side current, two phase currents among the three phase currents are detected. On the basis of these two phase currents, the other one phase current is detected.

The two phase currents are detected at two timings which are symmetric about the apex of the carrier signal for each period of the carrier signal. By calculating the average value of the currents detected at these two timings, the phase current is detected.

SUMMARY

A power conversion apparatus includes: a power converter that includes a plurality of switching elements and performs power conversion between DC power and three-phase AC power; a switch controller that controls the plurality of switching elements so that the order of outputting a plurality of kinds of voltage vectors from the power converter is opposite in a first half and a latter half of a carrier period; a DC-side current detector that detects a DC-side current of the power converter; and a phase current detector that detects one phase current among three phase currents on the basis of the DC-side current detected by the DC-side current detector at a detection timing, the detection timing being selected from a first-half timing and a latter-half timing of the carrier period at which the same kind of voltage vector of the plurality of kinds of voltage vectors is output. The phase current detector includes a timing switcher that alternately switches the detection timing between the first-half timing and the latter-half timing.

BRIEF DESCRIPTION OF THE DRAWINGS

FIG. 2 illustrates the relation among the fundamental voltage vectors, the PWM signals, and the detection currents;
FIG. 7 illustrates the relation between the regions 1 to 6 and the voltage vector patterns;
FIG. 8 illustrates the relations among the regions, the determination conditions, and the calculation formulae;
FIG. 9 illustrates the switch coefficient table of the timing switcher.

DESCRIPTION OF THE EMBODIMENTS

Figure 1:
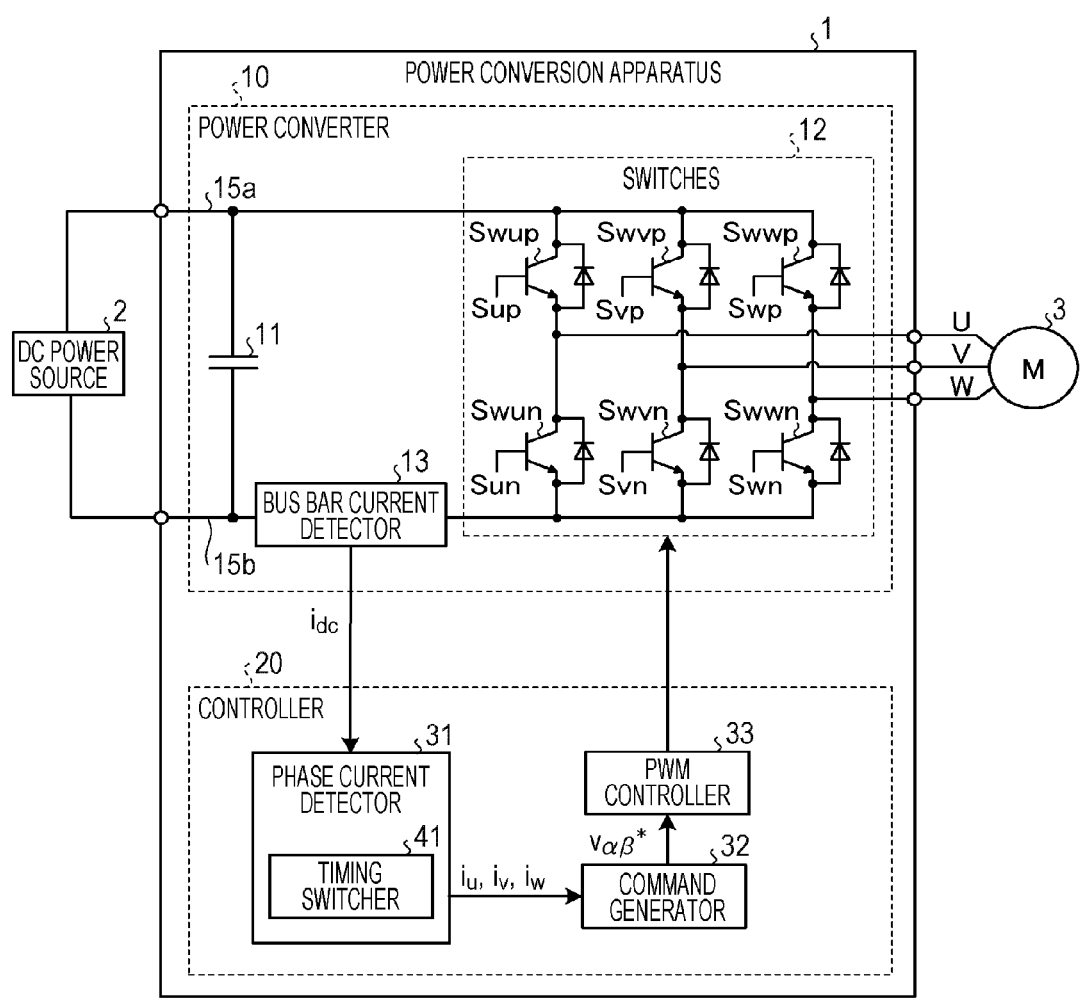
FIG. 1 illustrates a structure example of a power conversion apparatus according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A power conversion apparatus according to one aspect of the embodiment includes a power converter, a switch controller, a DC-side current detector, and a phase current detector. The power converter includes a plurality of switching elements and performs power conversion between DC power and three-phase AC power. The switch controller controls the plurality of switching elements so that the order of outputting a plurality of kinds of voltage vectors from the power converter is opposite in a first half and a latter half of a carrier period. The DC-side current detector detects a DC-side current of the power converter. The phase current detector detects one phase current among three phase currents on the basis of the DC-side current detected by the DC-side current detector at a detection timing, the detection timing being selected from a first-half timing and a latter-half timing of the carrier period at which the same kind of voltage vector of the plurality of kinds of voltage vectors is output. The phase current detector includes a timing switcher that alternately switches the detection timing between the first-half timing and the latter-half timing.

According to one aspect of the embodiment, the power conversion apparatus, the phase current detection apparatus, and the phase current detection method, which can reduce the burden in the process for the phase current detection, can be provided.

Embodiments of a power conversion apparatus, a phase current detection apparatus, and a phase current detection method to be disclosed herein will be described in detail with reference to the attached drawings. The embodiments to be described below will not restrict the technical range of the present disclosure.

1. Power Conversion Apparatus

FIG. 1 illustrates a structure example of a power conversion apparatus 1 according to an embodiment. The power conversion apparatus 1 illustrated in FIG. 1 is disposed between a DC power source 2 and an electric motor 3. The power conversion apparatus 1 includes a power converter 10 and a controller 20.

The power converter 10 includes a capacitor 11, switches 12, and a bus bar current detector 13 (one example of DC-side current detector). The power converter 10 converts the DC power, which is supplied from the DC power source 2, to the three-phase AC power and outputs the three-phase AC power to the electric motor 3. The capacitor 11 is connected in parallel to the DC power source 2. The capacitor 11 is a capacitor connected between DC bus bars 15a and 15b (hereinafter may be referred to as DC bus bars 15), and is also called a main circuit capacitor.

The switches 12 constitute, for example, a three-phase bridge circuit. As illustrated in FIG. 1, the switches 12 include a plurality of switching elements Swup, Swun, Swvp, Swvn, Swwp, and Swwn (hereinafter may be referred to as switching elements Sw). The ON/OFF of the plurality of switching elements Sw is controlled with the controller 20. Accordingly, the DC power supplied from the DC power source 2 is converted into the three-phase AC power and the three-phase AC power is output to the electric motor 3. Thus, the electric motor 3 is controlled. Note that the power conversion apparatus 1 may output the three-phase AC power to the power system instead of to the electric motor 3.

The switching element Sw is, for example, a semiconductor switching element such as a Metal-Oxide-Semiconductor Field-Effect Transistor (MOSFET) or an Insulated Gate Bipolar Transistor (IGBT). Alternatively, the switching element Sw may be a next-generation semiconductor switching element such as SiC or GaN. In the description below, the switching elements Swup, Swvp, and Swwp may be referred to as upper arms while the switching elements Swun, Swvn, and Swwn may be referred to as lower arms.

The bus bar current detector 13 detects the current flowing in the DC bus bar 15. The bus bar current detector 13 detects the instantaneous value $i_{dc}$ of the current flowing in the DC bus bar 15 (hereinafter referred to as the bus bar current $i_{dc}$). The bus bar current detector 13 has, for example, a shunt resistor. In this case, the bus bar current detector 13 detects the bus bar current $i_{dc}$ on the basis of the voltage across the shunt resistor.

Note that the bus bar current detector 13 may be configured to detect the bus bar current $i_{dc}$ using a Hall element as a magnetoelectric converter or a current transformer, instead of the shunt resistor. As long as the bus bar current detector 13 detects the DC-side current of the power converter 10, such as the current flowing in the DC bus bar 15, the position of the bus bar current detector 13 is not limited to the position illustrated in FIG. 1.

The controller 20 includes a phase current detector 31, a command generator 32, and a PWM controller 33 (one example of switch controller). The controller 20 includes, for example, a microcomputer including a Central Processing Unit (CPU), a Read Only Memory (ROM), a Random Access Memory (RAM), an input/output port, and the like, and/or other various circuits.

Causing the CPU of the microcomputer to read out programs stored in the ROM and execute the programs can achieve the functions of the phase current detector 31, the command generator 32, and the PWM controller 33. The phase current detector 31, the command generator 32, and the PWM controller 33 may be partly or entirely configured by hardware such as Application Specific Integrated Circuit (ASIC) or Field Programmable Gate Array (FPGA).

The phase current detector 31 detects the instantaneous values $i_u$, $i_v$, and $i_w$ of the phase currents (hereinafter referred to as the phase currents $i_u$, $i_v$, and $i_w$) flowing between the power converter 10 and the U phase, V phase, and W phase of the electric motor 3 on the basis of the bus bar current $i_{dc}$ (one example of DC-side current) detected by the bus bar current detector 13. The phase current $i_u$ (hereinafter referred to as U-phase current $i_u$) is the detection value of the U-phase current. The phase current $i_v$ (hereinafter referred to as V-phase current $i_v$) is the detection value of the V-phase current. The phase current $i_w$ (hereinafter referred to as W-phase current $i_w$) is the detection value of the W-phase current.

The command generator 32 generates a voltage command vector $v_{\alpha\beta}^*$ so that the phase currents $i_u$, $i_v$, and $i_w$ become the target current on the basis of the phase currents $i_u$, $i_v$, and $i_w$. The voltage command vector $v_{\alpha\beta}^*$ includes, for example, the α-axis voltage command $v_\alpha^*$ and the β-axis voltage command $v_\beta^*$, which are the αβ components of the two orthogonal axes on the fixed coordinate.

The PWM controller 33 generates PWM signals S on the basis of the voltage command vector $v_{\alpha\beta}^*$. The PWM signals S are the signals for controlling the plurality of switching elements Sw so that the order of outputting a plurality of kinds of fundamental voltage vectors from the power converter 10 becomes opposite in the first half and the latter half of the carrier period. The PWM signals S includes PWM signals Sup, Sun, Svp, Svn, Swp, and Swn.

FIG. 2 illustrates the relation among the fundamental voltage vectors, the PWM signals Sup, Svp, and Swp, and the detection currents (bus bar currents $i_{dc}$). The PWM signals Sun, Svn, and Swn are generated by, for example, inverting the PWM signals Sup, Svp, and Swp, respectively.

As illustrated in FIG. 2, in the case where the PWM signal Sup is at the active level (for example, high level) and the PWM signals Svp and Swp are at the non-active level (for example, low level), the power converter 10 outputs the fundamental voltage vector $V_1$.

In the state that the fundamental voltage vector $V_1$ is output, the bus bar current $i_{dc}$ detected by the bus bar current detector 13 coincides with the U-phase current $i_u$. Therefore, the phase current detector 31 can detect the U-phase current $i_u$ by acquiring the bus bar current $i_{dc}$ detected by the bus bar current detector 13 at the timing when the fundamental voltage vector $V_1$ is output.

For example, in the case where the PWM signals Sup and Svp are at the active level (for example, high level) and the PWM signal Swp is at the non-active level (for example, low level), the power converter 10 outputs the fundamental voltage vector $V_3$.

In the state that the fundamental voltage vector $V_3$ is output, the bus bar current $i_{dc}$ detected by the bus bar current detector 13 coincides with the inversion value of the W-phase current $i_w$. Therefore, the phase current detector 31 can detect the W-phase current $i_w$ by acquiring the bus bar current $i_{dc}$ detected by the bus bar current detector 13 at the timing when the fundamental voltage vector $V_3$ is output, and then inverting the acquired bus bar current $i_{dc}$.

Figure 3:
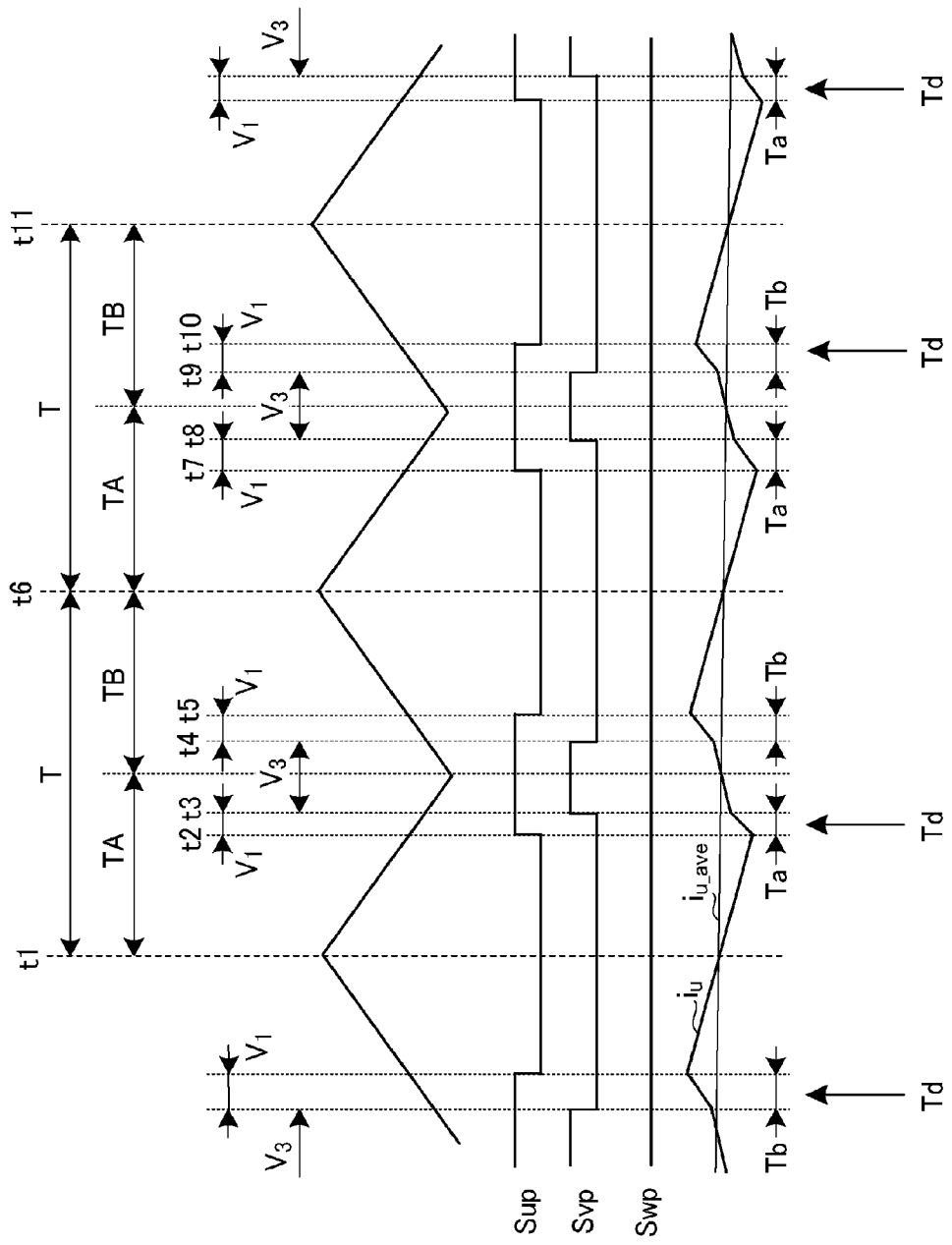
FIG. 3 illustrates one example of the state of the PWM signals, the state of the U-phase current, and the state of the average value of the U-phase current.

FIG. 3 illustrates the state of the PWM signals Sup, Svp, and Swp, the state of the U-phase current $i_u$, and the state of the average value $i_{u\_ave}$ of the U-phase current $i_u$ (hereinafter also referred to as U-phase average current $i_{u\_ave}$) in the case where the fundamental voltage vectors are output in the order of $V_0 \rightarrow V_1 \rightarrow V_3 \rightarrow V_3 \rightarrow V_1 \rightarrow V_0$ from the power converter 10. In the description below, "TA" in FIG. 3 refers to the first half of the carrier period T and "TB" in FIG. 3 refers to the latter half of the carrier period T. However, alternatively, "TA" may refer to the latter half of the carrier period T and "TB" may refer to the first half of the carrier period T.

As illustrated in FIG. 3, the plurality of kinds of fundamental voltage vectors $V_0$, $V_1$, and $V_3$ is output from the power converter 10 so that the order of outputting the plurality of kinds of fundamental voltage vectors $V_0$, $V_1$, and $V_3$ is opposite in the first half TA and the latter half TB of the carrier period.

Therefore, the fundamental voltage vector $V_1$ is output, for example, at the timing of the first half of one carrier period T (hereinafter referred to as a first-half timing Ta) and at the timing of the latter half thereof (hereinafter referred to as a latter-half timing Tb). In the example illustrated in FIG. 3, the first-half timing Ta corresponds to a period from the time t2 to the time t3, and a period from the time t7 and the time t8. The latter-half timing Tb corresponds to a period from the time t4 to the time t5, and a period from the time t9 and the time t10.

A detection timing Td of the phase current detector 31 is one of the first-half timing Ta and the latter-half timing Tb at which the same kind of voltage vector is output. The phase current detector 31 detects the U-phase current $i_u$ on the basis of the bus bar current $i_{dc}$ detected by the bus bar current detector 13 at the detection timing Td. Accordingly, in the phase current detector 31, the burden in the process for the phase current detection can be reduced as compared to the case where the detection timing Td is both the first-half timing Ta and the latter-half timing Tb.

As illustrated in FIG. 3, the U-phase current $i_u$ detected at the first-half timing Ta is lower than the U-phase average current $i_{u\_ave}$ due to the influence of the carrier ripple. Moreover, the U-phase current $i_u$ detected at the latter-half timing Tb is higher than the U-phase average current $i_{u\_ave}$ due to the influence of the carrier ripple. The U-phase current $i_u$ detected at the first-half timing Ta and the U-phase current $i_u$ detected at the latter-half timing Tb both have the difference from the U-phase average current $i_{u\_ave}$.

In view of the above, the phase current detector 31 includes a timing switcher 41 as illustrated in FIG. 1. The timing switcher 41 alternately switches the detection timing Td between the first-half timing Ta and the latter-half timing Tb for every carrier period T as illustrated in FIG. 3. This makes the average value of the plurality of U-phase currents $i_u$ detected in the plurality of carrier periods T substantially coincide with the U-phase average current $i_{u\_ave}$. This allows the accurate detection of the U-phase current $i_u$.

In this manner, the phase current detector 31 employs one of the first-half timing Ta and the latter-half timing Tb as the detection timing Td in one carrier period T. This can reduce the process burden. The phase current detector 31 alternately switches the detection timing Td between the first-half timing Ta and the latter-half timing Tb, for example, for every carrier period T. This enables the accurate detection of the phase current.

2. Controller 20

Figure 4:
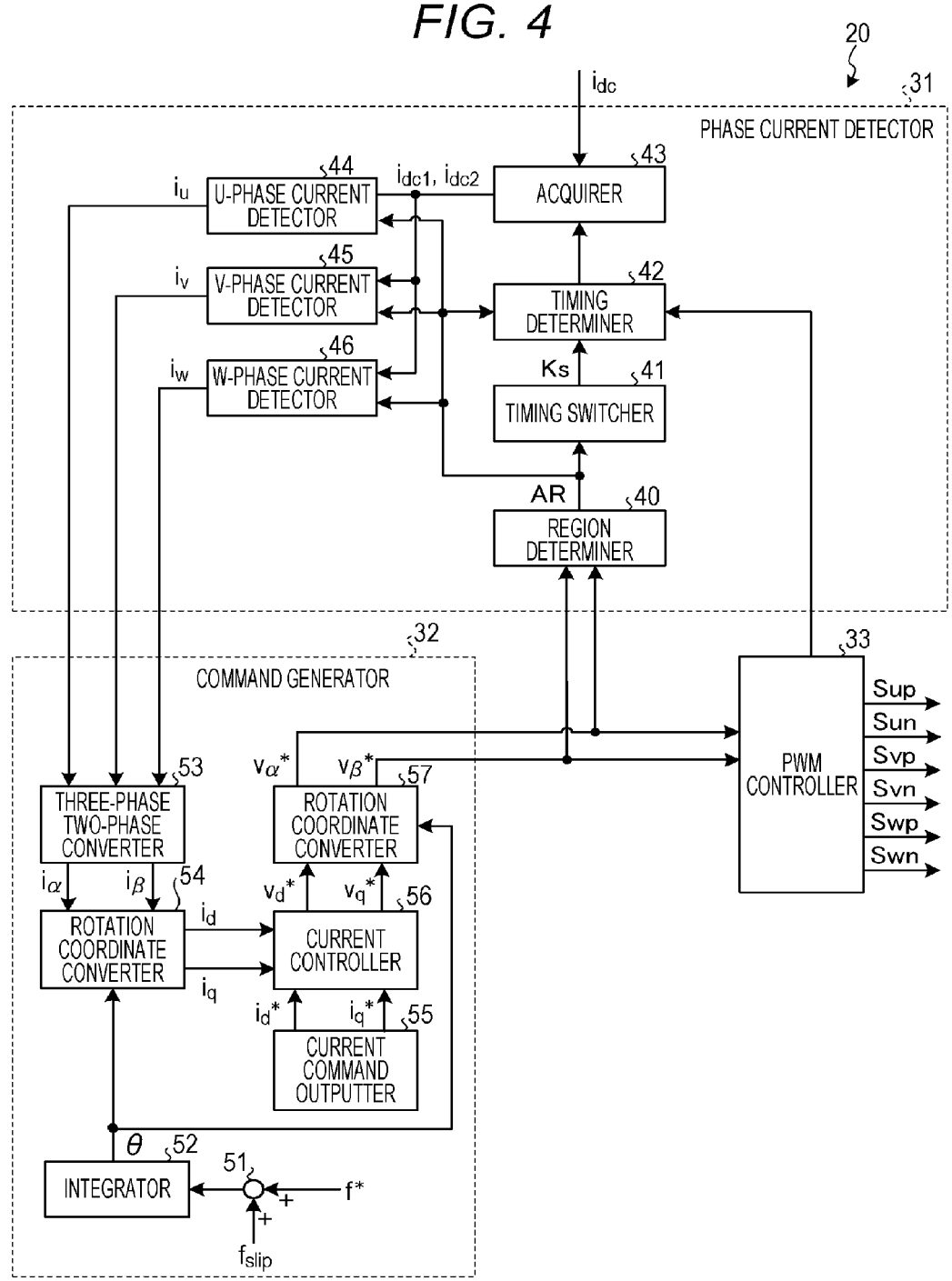
FIG. 4 illustrates a structure example of the controller illustrated in FIG. 1.

FIG. 4 illustrates the structure example of the controller 20 illustrated in FIG. 1. As described above, the controller 20 includes the phase current detector 31, the command generator 32, and the PWM controller 33. The structure example of the phase current detector 31, the command generator 32, and the PWM controller 33 is described below in the order of the command generator 32, the PWM controller 33, and the phase current detector 31.

2.1 Command Generator 32

As illustrated in FIG. 4, the command generator 32 includes an adder 51, an integrator 52, a three-phase two-phase converter 53, a rotation coordinate converter 54, a current command outputter 55, a current controller 56, and a rotation coordinate converter 57.

The adder 51 adds a slip frequency $f_{slip}$ to the frequency command f*. The integrator 52 integrates the addition result of the adder 51 to provide a phase θ. The phase θ can be obtained by another known method. The structure of detecting the phase θ is not limited to the structure illustrated in FIG. 4.

The three-phase two-phase converter 53 calculates the α-axis current $i_\alpha$ as the α-axis component and the β-axis current $i_\beta$ as the β-axis component of the two orthogonal axes on the fixed coordinate from the phase currents $i_u$, $i_v$, and $i_w$ through the known three-phase two-phase conversion. The rotation coordinate converter 54 converts the α-axis current $i_\alpha$ and the β-axis current $i_\beta$, which are the components of the αβ-coordinate system, into the d-axis current $i_d$ and the q-axis current $i_q$ through the known αβ/dq conversion on the basis of the phase θ. The d-axis current $i_d$ is the d-axis component of the dq-axis coordinate system, which is the rotation coordinate system. The q-axis current $i_q$ is the q-axis component of this dq-axis coordinate system.

The current command outputter 55 outputs the d-axis current command $i_d^*$ and the q-axis current command $i_q^*$. The current controller 56 generates the d-axis voltage command $v_d^*$ by executing the PI (proportional integral) control so that the deviation between the d-axis current command $i_d^*$ and the d-axis current $i_d$ becomes zero. The current controller 56 generates the q-axis voltage command $v_q^*$ by executing the PI control so that the deviation between the q-axis current command $i_q^*$ and the q-axis current $i_q$ becomes zero.

The rotation coordinate converter 57 converts the coordinates of the d-axis voltage command $V_d$ and the q-axis voltage command $V_q^*$, which are the components of the dq-axis coordinate system, into the voltage command vectors $v_{\alpha\beta}^*$ corresponding to the components of the αβ-axis coordinate system through the known dq/αβ conversion. The structure of the command generator 32 is not limited to the structure illustrated in FIG. 4 as long as the command generator 32 is configured to generate the voltage command vector $v_{\alpha\beta}^*$.

2.2 PWM Controller 33

The PWM controller 33 controls the plurality of switching elements Sw provided for the power converter 10 so that the power converter 10 outputs the plurality of kinds of voltage vectors in the opposite order in the first half and the latter half of the carrier period T.

Figures 5, 6:
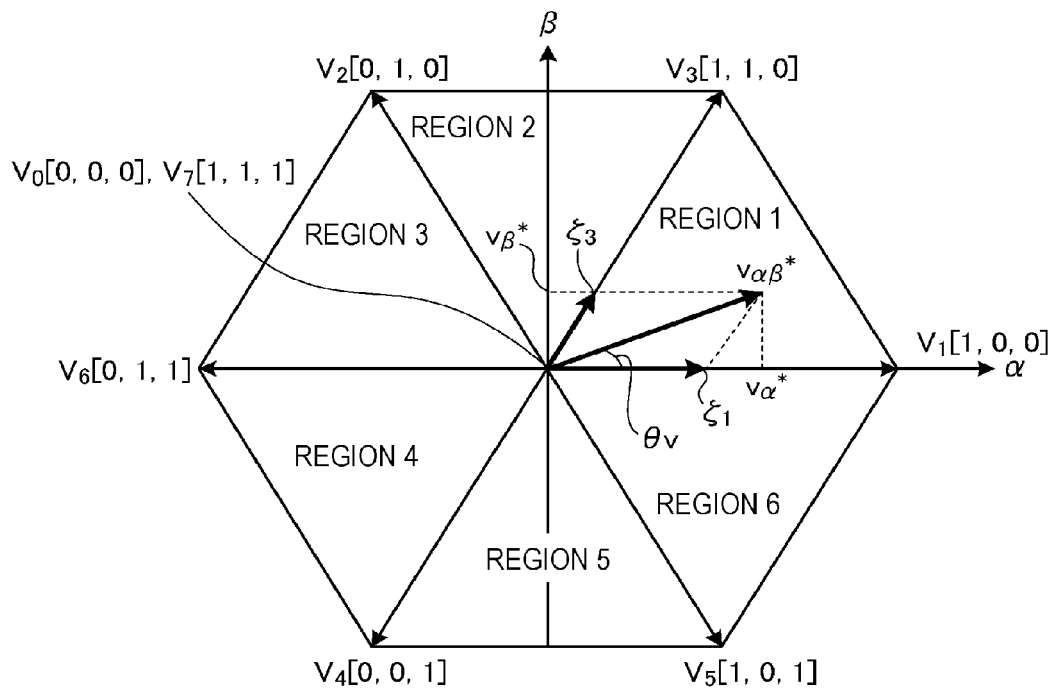
FIG. 5 illustrates the relation among the phases of the voltage command vector, the regions, and the fundamental voltage vectors.
FIG. 6 illustrates the relation among the phases of the voltage command vector, the regions, and the fundamental voltage vectors.

The PWM controller 33, for example, calculates the output time ratios $\zeta_x$ and $\zeta_y$ of the plurality of fundamental voltage vectors $V_x$ and $V_y$ (examples of the voltage vector) corresponding to the voltage command vector $v_{\alpha\beta}^*$ from the power converter 10. FIG. 5 and FIG. 6 illustrate the relation among the phases θv of the voltage command vector $v_{\alpha\beta}^*$, regions 1 to 6, and the fundamental voltage vectors $V_1$ to $V_7$.

The fundamental voltage vector is the voltage vector that can be output from the power converter according to the combination of ON/OFF of the switching elements of the power converter. The fundamental voltage vectors that can be output from the power converter 10 illustrated in FIG. 1 are eight kinds of fundamental voltage vectors $V_0$ to $V_7$ corresponding to the eight combinations of the ON/OFF of the six switching elements Sw.

The fundamental voltage vectors $V_0$ to $V_7$ include the fundamental voltage vectors $V_0$ and $V_7$ corresponding to the two kinds of zero voltage vectors, and the fundamental voltage vectors $V_1$ to $V_6$ corresponding to the six kinds of effective voltage vectors. In the example to be described below, one fundamental voltage vector $V_0$ is used as the zero voltage vector. In addition to or instead of the fundamental voltage vector $V_0$, the fundamental voltage vector $V_7$ can be used.

The PWM controller 33 calculates the output time ratios $\zeta_x$ and $\zeta_y$ of the plurality of fundamental voltage vectors $V_x$ and $V_y$ corresponding to the region including the voltage command vector $v_{\alpha\beta}^*$. The PWM controller 33 determines that, for example, the region held between the two kinds of fundamental voltage vectors $V_x$ and $V_y$ with a phase difference of 60° having the voltage command vector $v_{\alpha\beta}^*$ interposed therebetween is the region where the voltage command vector $v_{\alpha\beta}^*$ exists.

The PWM controller 33 can determine the region including the voltage command vector $v_{\alpha\beta}^*$ on the basis of, for example, the phase $\theta v$ ($= a\tan(v_\beta^*/v_\alpha^*)$) of the voltage command vector $v_{\alpha\beta}^*$. The PWM controller 33 can alternatively determine the region including the voltage command vector $v_{\alpha\beta}^*$ by another method (for example, a method to be described below).

The PWM controller 33 determines, for example, the fundamental voltage vectors $V_1$ and $V_3$ as the fundamental voltage vectors $V_x$ and $V_y$ when $0 \leq \theta v < 60$, as illustrated in FIG. 6. Moreover, the PWM controller 33 calculates the output time ratios $\zeta_1$ and $\zeta_3$ of the fundamental voltage vectors $V_1$ and $V_3$ as the output time ratios $\zeta_x$ and $\zeta_y$. The PWM controller 33 calculates the output time ratio $\zeta_0$ ($= Tc - \zeta_x - \zeta_y$).

The PWM controller 33 generates the PWM signals S that control the power converter 10 so that the fundamental voltage vectors $V_x$, $V_y$, and $V_0$ are output at the time $T_x$ ($= \zeta_x \times T$), the time $T_y$ ($= \zeta_x \times T$), and the time $T_0$ ($= \zeta_0 \times T$) corresponding to the output time ratios $\zeta_x$, $\zeta_y$, and $\zeta_0$ for every carrier period T.

FIG. 7 illustrates the relation between the regions and the voltage vector patterns. As illustrated in FIG. 7, the PWM controller 33 generates the PWM signals S that control the power converter 10 so that the fundamental voltage vectors are output in the order of $V_0 \rightarrow V_1 \rightarrow V_3 \rightarrow V_3 \rightarrow V_1 \rightarrow V_0$ when, for example, $0 \leq \theta v < 60$.

The PWM controller 33 generates the PWM signals S that control the power converter 10 so that the fundamental voltage vectors are output in the order of $V_0 \rightarrow V_2 \rightarrow V_3 \rightarrow V_3 \rightarrow V_2 \rightarrow V_0$ when, for example, $60 \leq \theta v \leq 120$.

The structure of the PWM controller 33 is not limited to the structure of generating the PWM signals S by the space vector method as described above. For example, the PWM controller 33 may be configured to generate the PWM signals S so that the fundamental voltage vectors are output according to the voltage vector pattern illustrated in FIG. 7 by comparing the carrier signal and the three-phase voltage commands $v_u^*$, $v_v^*$, and $v_w^*$. In this case, the PWM controller 33 calculates the three-phase voltage commands $v_u^*$, $v_v^*$, and $v_w^*$ from the voltage command vector $v_{\alpha\beta}^*$ (or the d-axis voltage command $v_d^*$ and the q-axis voltage command $v_q^*$), for example. Moreover, the PWM controller 33 compares the three-phase voltage commands $v_u^*$, $v_v^*$, and $v_w^*$ and the carrier signal.

As illustrated in FIG. 2, when the fundamental voltage vectors $V_1$, $V_2$, and $V_4$ are output, the bus bar currents $i_{dc}$ are the positive-polarity phase currents $i_u$, $i_v$, and $i_w$, respectively. The fundamental voltage vectors $V_1$, $V_2$, and $V_4$ may hereinafter be described as the positive-polarity fundamental voltage vectors for the convenience. When the fundamental voltage vectors $V_3$, $V_5$, and $V_6$ are output, the bus bar currents $i_{dc}$ are the negative-polarity phase currents $i_u$, $i_v$, and $i_w$, respectively. The fundamental voltage vectors $V_3$, $V_5$, and $V_6$ may hereinafter be described as the negative-polarity fundamental voltage vectors for the convenience.

2.3 Phase Current Detector 31

As illustrated in FIG. 4, the phase current detector 31 includes a region determiner 40, a timing switcher 41, a timing determiner 42, an acquirer 43, a U-phase current detector 44, a V-phase current detector 45, and a W-phase current detector 46.

The region determiner 40 determines which region corresponds to the region including the voltage command vector $v_{\alpha\beta}^*$ in the regions 1 to 6 (see FIG. 5 and FIG. 6). For example, the region determiner 40 obtains the phase $\theta v$ of the voltage command vector $v_{\alpha\beta}^*$ and on the basis of the phase $\theta v$, determines the region AR including the voltage command vector $v_{\alpha\beta}^*$.

When the voltage command vector $v_{\alpha\beta}^*$ is in the state illustrated in FIG. 6 ($0 \leq \theta v < 60$), the region determiner 40 determines that the region 1 held between the two kinds of fundamental voltage vectors $V_1$ and $V_3$ with a phase difference of 60° having the voltage command vector $v_{\alpha\beta}^*$ interposed therebetween is the region AR including the voltage command vector $v_{\alpha\beta}^*$.

When the phase $\theta v$ of the voltage command vector $v_{\alpha\beta}^*$ is $120 \leq \theta v < 180$, the region determiner 40 determines that the region 3 held between the two kinds of fundamental voltage vectors $V_2$ and $V_6$ with a phase difference of 60° having the voltage command vector $v_{\alpha\beta}^*$ interposed therebetween is the region AR including the voltage command vector $v_{\alpha\beta}^*$ as illustrated in FIG. 6.

Note that the region determiner 40 can determine the region AR including the voltage command vector $v_{\alpha\beta}^*$ by a method other than the method using the phase $\theta v$. For example, the region determiner 40 can determine the region AR including the voltage command vector $v_{\alpha\beta}^{}$ on the basis of the determination condition illustrated in FIG. 8. FIG. 8 illustrates the relations among the regions, the determination conditions, and the calculation formulae. Note that "$v_{\alpha\beta}^{}$" in FIG. 8 is, for example, $v_{\alpha\beta}^{**} = |\sqrt{3} \times v_\alpha^*| - |v_\beta^*|$.

Back to FIG. 4, the description of the phase current detector 31 is continued. The timing switcher 41 of the phase current detector 31 switches the detection timing Td between the first-half timing Ta and the latter-half timing Tb in the carrier period T. The timing switcher 41 switches the detection timing Td by, for example, changing the timing coefficient Ks for switching the detection timing Td.

In the description below, the first-half timing Ta is the detection timing Td when Ks=1, and the latter-half timing Tb is the detection timing Td when Ks=−1. The method of setting the detection timing Td is not limited to this example.

The timing switcher 41 can change the timing coefficient Ks in, for example, the period that is n times the carrier period T (n is a natural number). For example, when the timing coefficient Ks is changed in the period that is twice the carrier period T, the timing switcher 41 sets the timing coefficient Ks for every carrier period T as Ks=1, Ks=1, Ks=−1, Ks=−1, Ks=1, . . . .

When the timing coefficient Ks is changed for every carrier period T, the timing switcher 41 sets the timing coefficient Ks for every carrier period T as Ks=1, Ks=−1, Ks=1, Ks=−1, . . . .

Incidentally, in some cases, the region including the voltage command vector $v_{\alpha\beta}^*$ in the previous carrier period T (hereinafter this region is referred to as the previous region) and the region including the voltage command vector $v_{\alpha\beta}^*$ in the current carrier period T (hereinafter this region is referred to as the current region) do not coincide with each other. In view of this, the phase current detector 31 decides the switch coefficient K for setting the timing coefficient Ks on the basis of the relation between the previous region and the current region.

FIG. 9 illustrates the switch coefficient table of the timing switcher 41. As illustrated in FIG. 9, the timing switcher 41 can decide whether the timing coefficient Ks is "1" or "−1" depending on which region is the previous region and which region is the current region with reference to the switch coefficient table.

The timing switcher 41 acquires the information on the previous region AR determined by the region determiner 40 (hereinafter referred to as the previous region $AR_0$) and the information on the current region AR determined by the region determiner 40 (hereinafter referred to as the current region $AR_1$). The timing switcher 41 calculates Ks=K×Ksz on the basis of the previous region $AR_0$, the current region $AR_1$, and the switch coefficient table. This enables the timing switcher 41 to set the current timing coefficient Ks. Note that "Ksz" is the previous timing coefficient Ks.

For example, when the previous region $AR_0$ and the current region $AR_1$ are the same, the timing switcher 41 sets K=−1 on the basis of the switch coefficient table illustrated in FIG. 9. Thus, unless there is a change in the region including the voltage command vector $v_{\alpha\beta}^*$, the timing coefficient Ks is changed for every carrier period T. Therefore, the detection timing Td changes between the previous region $AR_0$ and the current region $AR_1$.

Note that the timing switcher 41 can set the timing coefficient Ks for every period that is n times the carrier period T (n is a natural number). In this case, when there is no change in the region including the voltage command vector $v_{\alpha\beta}^*$, the timing switcher 41 sets K=−1 with reference to the switch coefficient table for every period that is n times the carrier period T. On the other hand, when there is a change in the region including the voltage command vector $v_{\alpha\beta}^*$, the timing switcher 41 sets K=1.

When the previous region $AR_0$ is "1" and the current region $AR_1$ is "2", the timing switcher 41 sets K=1. In this case, the timing coefficient Ks is the same in the previous region $AR_0$ and in the current region $AR_1$. The detection timing Td in the carrier period T is the same in the previous region $AR_0$ and in the current region $AR_1$.

On the other hand, when the previous region $AR_0$ is "2" and the current region $AR_1$ is "3", the timing switcher 41 sets K=−1. In this case, the timing coefficient Ks is different in the previous region $AR_0$ and in the current region $AR_1$. The detection timing Td in the carrier period T is different in the previous region $AR_0$ and in the current region $AR_1$.

In this manner, when the region decided on the basis of the voltage command vector $v_{\alpha\beta}^*$ is changed, the phase current detector 31 can stop to switch the detection timing Td before and after the change of the regions on the basis of the relation between the regions before and after the change.

The timing determiner 42 acquires from the PWM controller 33, the timing at which the PWM controller 33 outputs the fundamental voltage vector. In addition, the timing determiner 42 decides as the acquisition timing Tg in the detection timing Td, the timing at which the acquirer 43 acquires the bus bar current $i_{dc}$ detected by the bus bar current detector 13.

The acquirer 43 is, for example, an A/D converter. The acquirer 43 acquires the bus bar current $i_{dc}$ detected by the bus bar current detector 13 at the acquisition timing Tg decided by the timing determiner 42. For example, the signal corresponding to the bus bar current $i_{dc}$, which is output from the bus bar current detector 13, may be an analog signal. In this case, the acquirer 43 acquires the signal corresponding to the bus bar current $i_{dc}$, which is output from the bus bar current detector 13, as a digital signal (digital value) at the acquisition timing Tg decided by the timing determiner 42.

When the positive-polarity fundamental voltage vector is output from the power converter 10, the bus bar current $i_{dc}$ detected by the bus bar current detector 13 is described as a first bus bar current $i_{dc1}$. When the negative-polarity fundamental voltage vector is output from the power converter 10, the bus bar current $i_{dc}$ detected by the bus bar current detector 13 is described as a second bus bar current $i_{dc2}$.

Figure 10:
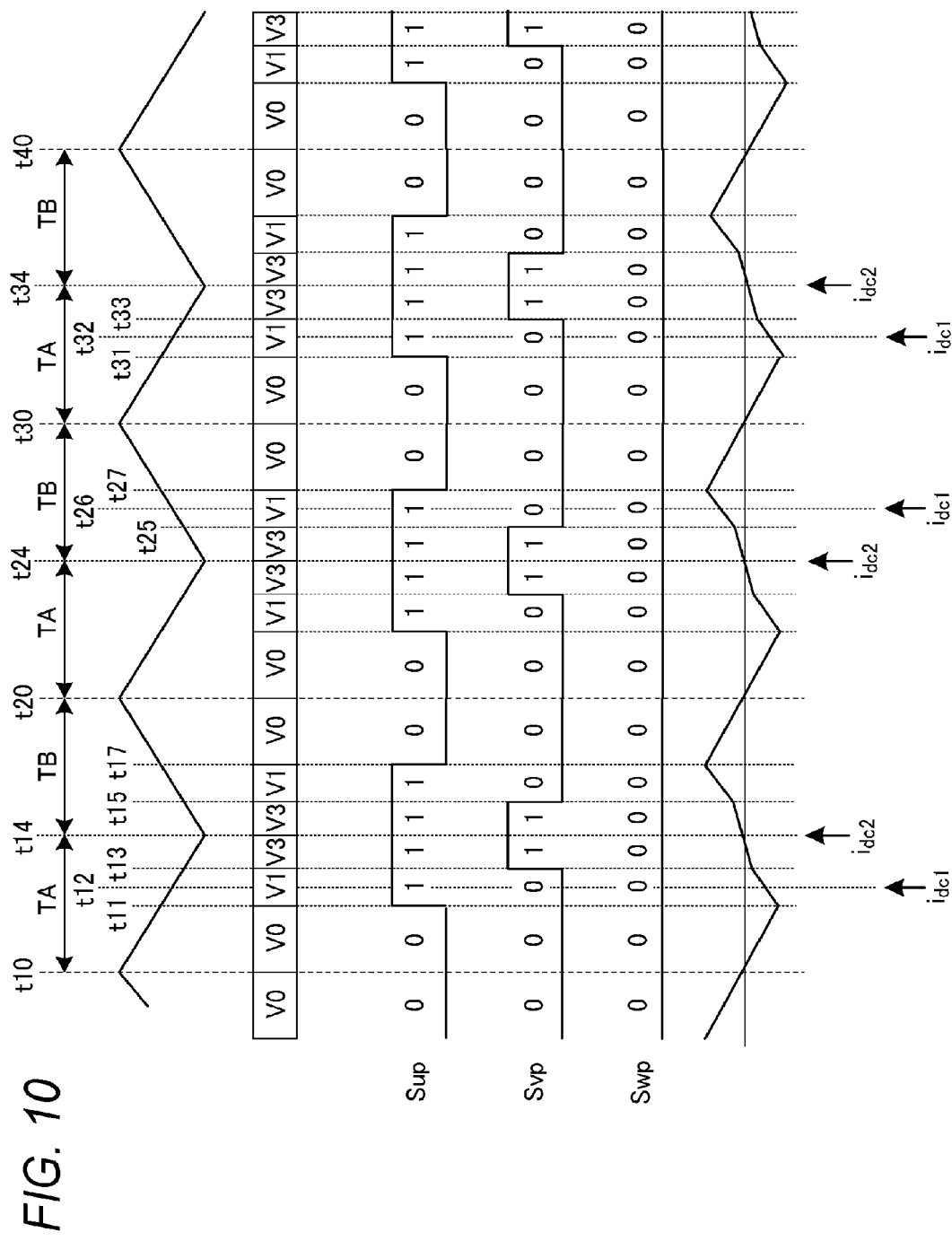
FIG. 10 illustrates one example of the timing at which the phase current detector acquires the bus bar current.

FIG. 10 illustrates one example of the acquisition timing Tg of acquiring the bus bar current $i_{dc}$ in the phase current detector 31 (acquirer 43). In the example illustrated in FIG. 10, the voltage command vector $v_{\alpha\beta}^*$ exists in the region 1, and the fundamental voltage vector is output in the order of $V_0 \rightarrow V_1 \rightarrow V_3 \rightarrow V_1 \rightarrow V_0$.

As illustrated in FIG. 10, the phase current detector 31 (acquirer 43) acquires the bus bar current $i_{dc}$ at the timings at which the two fundamental voltage vectors $V_1$ and $V_3$ are output. The timing determiner 42 determines one of the first-half timing Ta and the latter-half timing Tb as the detection timing Td on the basis of the timing coefficient Ks set by the timing switcher 41. At the first-half timing Ta and the latter-half timing Tb, the power converter 10 outputs the fundamental voltage vector $V_1$.

For example, the timing determiner 42 selects the first-half timing Ta when the timing coefficient Ks is "1." On the other hand, the timing determiner 42 determines (selects) the latter-half timing Tb as the detection timing Td when the timing coefficient Ks is "−1." The timing determiner 42 decides the timing in the detection timing Td, which is in the center in the period where the fundamental voltage vector is output, as the acquisition timing Tg (hereinafter described as a first acquisition timing Tg1).

In the example illustrated in FIG. 10, the timing determiner 42 decides as the first acquisition timing Tg1, the central timing (for example, times t12, t26, and t32) of the detection timings Td (for example, times t11 to t13, t25 to t27, and t31 to t33) corresponding to the period for which the fundamental voltage vector $V_1$ is output. The acquirer 43 acquires as the first bus bar current $i_{dc1}$, the bus bar current $i_{dc}$ detected by the bus bar current detector 13 at the decided first acquisition timing Tg1.

Here, "the period for which the fundamental voltage vector is output" is the period for which the fundamental voltage vector is output in fact in consideration of the on-delay correction. Thus, the phase current can be detected with higher accuracy.

The phase current detector 31 (acquirer 43) acquires as the second bus bar current $i_{dc2}$, the bus bar current $i_{dc}$ detected by the bus bar current detector 13 in the state that the fundamental voltage vector $V_3$ is output from the power converter 10.

The fundamental voltage vector $V_3$ includes the timings (for example, times t14, t24, and t34) corresponding to the valleys of the carrier signals Sc. The fundamental voltage vector $V_3$ is output in the periods symmetric about the valley timing. The bus bar current $i_{dc}$ detected at the valley timing of the carrier signal Sc can be regarded as the average phase current $i_{w\_ave}$ with the carrier ripple suppressed.

The timing determiner 42 decides the timing corresponding to the valley of the carrier signal Sc as the acquisition timing (hereinafter also referred to as a second acquisition timing Tg2). The acquirer 43 acquires the bus bar current $i_{dc}$ as the second bus bar current $i_{dc2}$ at the second acquisition timing Tg2. This can increase the detection accuracy of the phase current $i_w$ detected by obtaining the inversion value of the second bus bar current $i_{dc2}$.

In the case of the fundamental voltage vector $V_3$, the timing corresponding to the valley of the carrier signal Sc is desirably the substantially central timing of the period for which the fundamental voltage vector $V_3$ is actually output. Accordingly, as compared to the case where the timing corresponding to the valley of the carrier signal Sc is the second acquisition timing Tg2, the second acquisition timing Tg2 is the timing determined in consideration of the on-delay correction. Thus, the phase current can be detected with higher accuracy.

Back to FIG. 4, the description of the phase current detector 31 is continued. The phase current detector 31 includes the U-phase current detector 44, the V-phase current detector 45, and the W-phase current detector 46 as described above. The phase current detector 31 detects the U-phase current $i_u$, the V-phase current $i_v$, and the W-phase current $i_w$ on the basis of the relation between the regions illustrated in FIG. 7 and the calculation formulae (see FIG. 8).

For example, when the region AR determined by the region determiner 40 is the region 1, the U-phase current detector 44 detects the first bus bar current $i_{dc1}$ as the U-phase current $i_u$ and the W-phase current detector 46 detects the polarity-inverted value of the second bus bar current $i_{dc2}$ as the W-phase current $i_w$. The V-phase current detector 45 adds up the polarity-inverted value of the first bus bar current $i_{dc1}$ and the second bus bar current $i_{dc2}$, and detects the addition result as the V-phase current $i_v$.

When the region AR is the region 1, the U-phase current detector 44 functions as the first detector that detects the one phase current among the three phase currents $i_u$, $i_v$, and $i_w$ on the basis of the bus bar current $i_{dc}$ detected by the bus bar current detector 13 at the first acquisition timing Tg1.

When the region AR is the region 1, the W-phase current detector 46 functions as the second detector that detects the one phase current among the three phase currents $i_u$, $i_v$, and $i_w$, which is different from the phase current detected by the first detector (U-phase current detector 44), on the basis of the bus bar current $i_{dc}$ detected by the bus bar current detector 13 at the second acquisition timing Tg2 among the three phase currents $i_u$, $i_v$, and $i_w$. The second detector may be configured to detect the one phase current among the three phase currents $i_u$, $i_v$, and $i_w$, which is different from the phase current detected by the first detector, on the basis of the bus bar current $i_{dc}$ detected by the bus bar current detector 13 at the timing corresponding to at least one of the peak and the valley of the carrier signal Sc in the carrier period T, which will be described below.

When the region AR is the region 1, the V-phase current detector 45 functions as the third detector that detects the one phase current among the three phase currents $i_u$, $i_v$, and $i_w$, which is different from the phase currents detected by the first detector and the second detector, on the basis of the detection result of the first detector and the detection result of the second detector.

For example, when the region AR is the region 3, the U-phase current detector 44 detects the polarity-inverted value of the second bus bar current $i_{dc2}$ as the U-phase current $i_u$ and the V-phase current detector 45 detects the first bus bar current $i_{dc1}$ as the V-phase current $i_v$. The W-phase current detector 46 adds up the polarity-inverted value of the first bus bar current $i_{dc1}$ and the second bus bar current $i_{dc2}$, and detects the addition result as the W-phase current $i_w$. In this case, the U-phase current detector 44 functions as the second detector, the V-phase current detector 45 functions as the first detector, and the W-phase current detector 46 functions as the third detector.

In this manner, which of the U-phase current detector 44, the V-phase current detector 45, and the W-phase current detector 46 functions as which of the first to third detectors depends on which one of the regions 1 to 6 the region AR is.

3. Process by Controller 20

Figure 11:
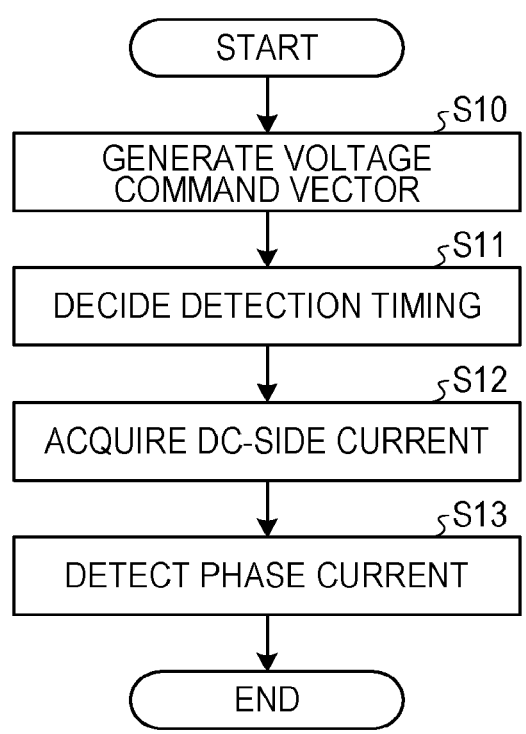
FIG. 11 is a flowchart of the process conducted by the controller.

FIG. 11 is a flowchart of the process conducted by the controller 20. The process illustrated in FIG. 11 is, for example, repeated.

As illustrated in FIG. 11, the command generator 32 generates the voltage command vector $v_{\alpha\beta}$* (Step S10) and next, the phase current detector 31 decides the detection timing Td on the basis of the voltage command vector $v_{\alpha\beta}$* (Step S11).

The phase current detector 31 detects the bus bar current $i_{dc}$ detected by the bus bar current detector 13 at the decided detection timing Td (Step S12). In this process, the phase current detector 31 alternately switches the detection timing Td between the first-half timing Ta and the latter-half timing Tb for every period that is n times the carrier period T. The phase current detector 31 detects the phase current on the basis of the detected bus bar current $i_{dc}$ (Step S13).

Figure 12:
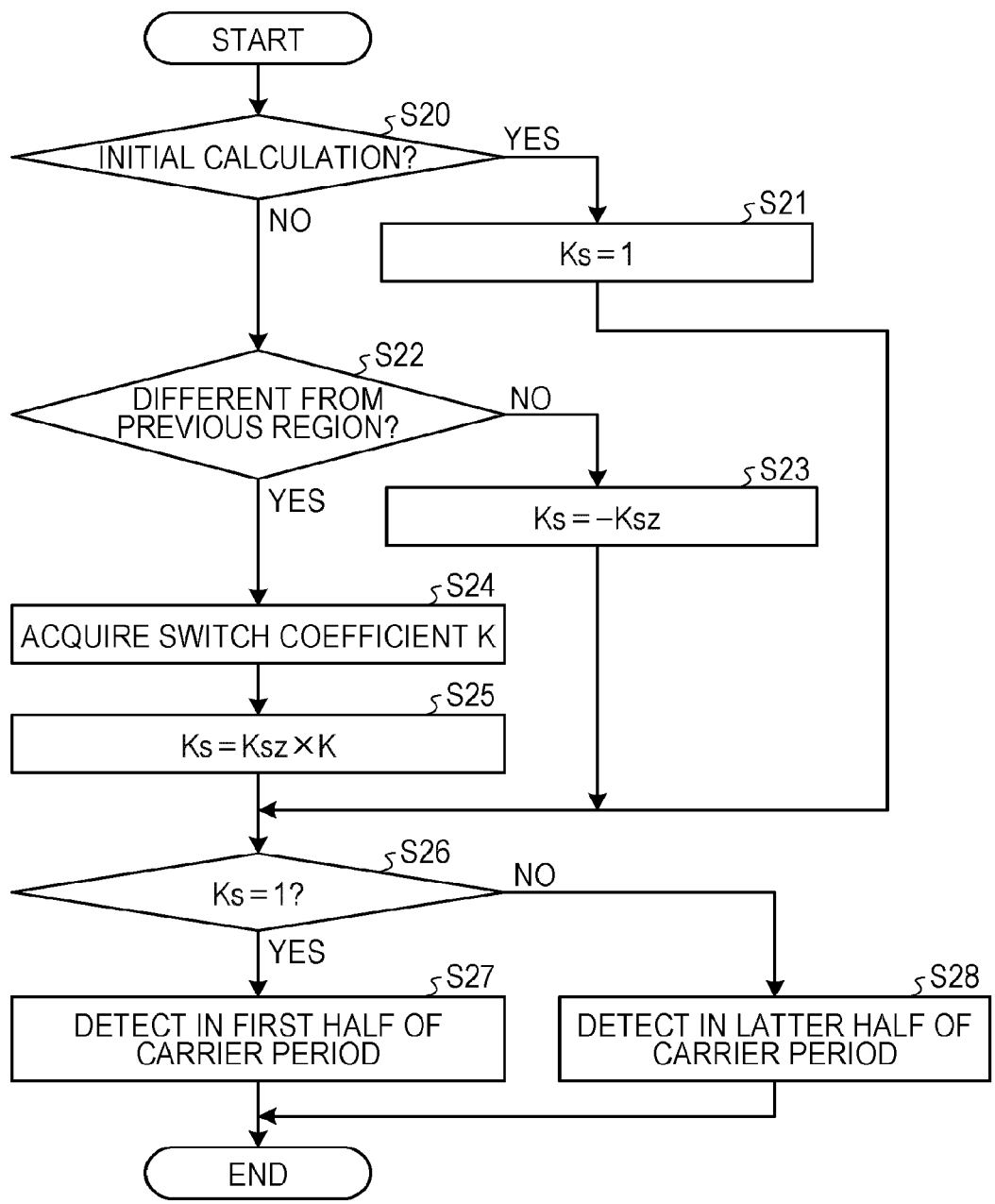
FIG. 12 illustrates one example of Steps S12 and S13 illustrated in FIG. 11.

Here, the process in Step S12 and Step S13 is described further. FIG. 12 illustrates one example of Steps S12 and S13. This process is performed for every period that is n times the carrier period T. In the example illustrated in FIG. 12, the process of determining whether to switch the detection timing Td is carried out for every carrier period T.

As illustrated in FIG. 12, the timing switcher 41 of the phase current detector 31 determines whether it is the initial calculation (Step S20). The timing switcher 41 determines that it is the initial calculation if the time is the start time of the decision process illustrated in FIG. 12. Having determined that it is the initial calculation (Yes in Step S20), the timing switcher 41 sets the timing coefficient Ks to "1" (Step S21).

On the other hand, if the timing switcher 41 has determined that it is not the initial calculation (No in Step S20), whether the current region $AR_1$ is different from the previous region $AR_0$ or not is determined (Step S22). In this process, if it is determined that the current region $AR_1$ is not different from the previous region $AR_0$ (No in Step S22), the timing switcher 41 sets Ks=−Ksz. That is to say, the timing switcher 41 inverts the polarity of the previous timing coefficient Ks (Step S23).

If it is determined that the current region $AR_1$ is different from the previous region $AR_0$ (Yes in Step S22), the timing switcher 41 acquires the switch coefficient K from the switch coefficient table on the basis of the relation between the previous region $AR_0$ and the current region $AR_1$ (Step S24). The timing switcher 41 then calculates the timing coefficient Ks by multiplying the previous timing coefficient Ksz by the switch coefficient K (Step S25).

After the process of Steps S21, S23, and S25, the timing determiner 42 of the phase current detector 31 determines whether the timing coefficient Ks is "1" or not (Step S26). If the timing coefficient Ks is "1" (Yes in Step S26), the phase current detector 31 sets the first-half timing Ta as the detection timing Td. In addition, the phase current detector 31 detects (acquires) the bus bar current $i_{dc}$ detected by the bus bar current detector 13 at the detection timing Td (Step S27). For example, the phase current detector 31 sets the central timing of the first-half timing Ta corresponding to the detection timing Td, as the first acquisition timing Tg1. The phase current detector 31 can detect (acquire) the bus bar current $i_{dc}$ detected at the first acquisition timing Tg1.

On the other hand, if the timing coefficient Ks is "−1" (No in Step S26), the phase current detector 31 sets the latter-half timing Tb as the detection timing Td. In addition, the phase current detector 31 detects (acquires) the bus bar current $i_{dc}$ detected by the bus bar current detector 13 at the detection timing Td (Step S28). For example, the phase current detector 31 sets the central timing of the latter-half timing Tb corresponding to the detection timing Td, as the first acquisition timing Tg1. The phase current detector 31 can detect (acquire) the bus bar current $i_{dc}$ detected at the first acquisition timing Tg1.

In the above embodiment, the timing switcher 41 alternately switches the detection timing Td between the first-half timing Ta and the latter-half timing Tb for every period that is n times the carrier period T, when the previous region $AR_0$ and the current region $AR_1$ are not different. The switching method is, however, not limited to this example. For example, the timing switcher 41 may make the number of first-half timings Ta as the detection timing Td coincide with the number of latter-half timings Tb as the detection timing Td in m number of carrier periods T.

In the example of the voltage vector pattern illustrated in the above embodiment, the effective voltage vector is output at the timings corresponding to the valleys of the carrier (for example, the times t14, t24, and t34 in FIG. 10). However, the voltage vector pattern is not limited to this example. For example, the voltage vector pattern may be the pattern that the effective voltage vector is output at the timings corresponding to the peaks of the carrier (for example, the times t10, t20, t30, and t40 in FIG. 10). In this case, the second acquisition timing Tg2 of the second bus bar current $i_{dc2}$ is the timing corresponding to the peak of the carrier.

The voltage vector pattern may be the pattern that the zero voltage vector is output at the timings corresponding to the valleys and the peaks of the carrier and a plurality of kinds of effective voltage vectors is output in the period between the peak and the valley of the carrier. For example, the PWM controller 33 can control the power converter 10 so that the power converter 10 outputs the fundamental voltage vectors in the order of $V_0 \rightarrow V_1 \rightarrow V_3 \rightarrow V_7 \rightarrow V_3 \rightarrow V_1 \rightarrow V_0$. In this case, the timing switcher 41 sets one of the first-half timing Ta and the latter-half timing Tb as the detection timing Td for each of the fundamental voltage vectors $V_1$ and $V_3$. The timing determiner 42 sets as the first acquisition timing Tg1, the central timing of the detection timing Td of the fundamental voltage vector $V_1$. The timing determiner 42 sets as the second acquisition timing Tg2, the central timing of the detection timing Td of the fundamental voltage vector $V_3$. The acquirer 43 acquires as the first bus bar current $i_{dc1}$, the bus bar current $i_{dc}$ detected by the bus bar current detector 13 at the first acquisition timing Tg1. In addition, the acquirer 43 acquires as the second bus bar current $i_{dc2}$, the bus bar current $i_{dc}$ detected by the bus bar current detector 13 at the second acquisition timing Tg2.

As described above, the power conversion apparatus 1 according to the embodiment includes the power converter 10, the PWM controller 33 (one example of the switch controller), the bus bar current detector 13 (one example of the DC-side current detector), and the phase current detector 31. The power converter 10 includes a plurality of switching elements Sw to perform the power conversion between the DC power and the three-phase AC power. The PWM controller 33 controls the plurality of switching elements Sw so that the order of outputting the plurality of kinds of fundamental voltage vectors (one example of the voltage vector) from the power converter 10 is opposite in the first half and the latter half of the carrier period. The bus bar current detector 13 detects the bus bar current $i_{dc}$ (one example of the DC-side current) of the power converter 10. The phase current detector 31 sets as the detection timing Td, one of the first-half timing Ta and the latter-half timing Tb of the carrier period T at which the same kind of voltage vector among the plurality of kinds of voltage vectors is output. The phase current detector 31 detects the one phase current among the three phase currents $i_u$, $i_v$, and $i_w$ on the basis of the bus bar current $i_{dc}$ detected by the bus bar current detector 13 at the detection timing Td. The phase current detector 31 includes, for example, the timing switcher 41. The timing switcher 41 alternately switches the detection timing Td between the first-half timing Ta and the latter-half timing Tb. The combination of the PWM controller 33 and the phase current detector 31 corresponds to one example of the phase current detection apparatus. Further, the combination of the PWM controller 33, the phase current detector 31, and the command generator 32 corresponds to one example of the phase current detection apparatus.

As compared to the case of detecting the bus bar current $i_{dc}$ at both the first-half timing Ta and the latter-half timing Tb in the carrier period T, this can reduce the burden in the process for the phase current detection. Since the detection timing Td can be switched between the first-half timing Ta and the latter-half timing Tb, the error due to the difference of the detection timing Td can be reduced.

The phase current detector 31 detects the one phase current among the three phase currents $i_u$, $i_v$, and $i_w$ on the basis of the bus bar current $i_{dc}$ detected by the bus bar current detector 13 at the detection timing Td for every carrier period T.

This enables the detection timing Td to be switched between the first-half timing Ta and the latter-half timing Tb for every carrier period T, so that the error due to the difference of the detection timing Td can be reduced with high accuracy.

The phase current detector 31 detects the bus bar current $i_{dc}$ detected by the bus bar current detector 13, as the detection value of the one phase current corresponding to the kind of the fundamental voltage vector output from the power converter 10 (one example of the voltage vector) or as the polarity-inverted value of the detection value. This enables the appropriate detection of the phase current.

The timing switcher 41 alternately switches the detection timing Td between the first-half timing Ta and the latter-half timing Tb in the period that is n times the carrier period T (n is a natural number).

Since the detection timing Td is switched alternately between the first-half timing Ta and the latter-half timing Tb in the period that is n times the carrier period (n is a natural number), the error due to the difference of the detection timing Td can be reduced with high accuracy.

The power conversion apparatus 1 includes the command generator 32 that generates the voltage command vector $v_{\alpha\beta}^*$. When the region to be decided on the basis of the voltage command vector $v_{\alpha\beta}^*$ is changed, the timing switcher 41 stops to switch the detection timing Td before and after the change on the basis of the relation between the regions before and after the change.

In this manner, the timing switcher 41 stops to switch the detection timing Td before and after the change according to the regions before and after the change. This can accurately reduce the error caused by the change of the region.

The phase current detector 31 includes the region determiner 40. The region determiner 40 determines the region held between the two kinds of fundamental voltage vectors with a phase difference of 60° having the voltage command vector $v_{\alpha\beta}^*$ interposed therebetween. When the region determined by the region determiner 40 is changed, the timing switcher 41 stops to switch the detection timing Td before and after the change on the basis of the relation between the regions before and after the change.

Thus, the phase current detector 31 includes the region determiner 40 that determines the region including the voltage command vector $v_{\alpha\beta}^*$ from the regions divided by six fundamental voltage vectors for every 60°. This facilitates the detection of the change of the region.

The phase current detector 31 includes the timing determiner 42 and the acquirer 43. The timing determiner 42 determines as the acquisition timing Tg, the central timing of the period for which the fundamental voltage vector is output in the detection timing Td. The acquirer 43 acquires the detection result of the bus bar current detector 13 at the acquisition timing Tg determined by the timing determiner 42.

In this manner, the phase current detector 31 detects at least one phase current among the three phase currents $i_u$, $i_v$, and $i_w$ on the basis of the bus bar current $i_{dc}$ detected by the bus bar current detector 13 at the central timing of the output width of the fundamental voltage vector. This can suppress the influence from the current vibration generated in the switching.

The phase current detector 31 includes the U-phase current detector 44, the V-phase current detector 45, and the W-phase current detector 46. The U-phase current detector 44, the V-phase current detector 45, and the W-phase current detector 46 function as any of the first detector, the second detector, and the third detector according to the region where the voltage command vector $v_{\alpha\beta}^*$ exists.

This structure enables the accurate detection of the three phase currents $i_u$, $i_v$, and $i_w$ on the basis of the bus bar current $i_{dc}$ detected by the bus bar current detector 13.

The aforementioned power conversion apparatus 1 includes the power converter 10 and the following processing means. The processing means selects one of a plurality of timings at which the same kind of voltage vector is output, as the period including the timing for detecting the DC-side current in the power converter for every carrier period. This processing means selects one of the plurality of timings for every carrier period so that the plurality of timings is uniformly selected for a predetermined period. The phase current detector 31 corresponds to one example of the processing means.

Other effects and modified examples can be conceived easily by those skilled in the art. Therefore, the wider range of embodiments of the technique according to the present disclosure is not limited to the particular details and the representative embodiment described above. Thus, various changes can be made without departing from the spirit and range defined by the attached scope of claims and the equivalents.

The power conversion apparatus 1 may include the power converter 10 and a processing means that selects for every carrier period one of a plurality of timings at which the same kind of voltage vector is output as the period including the timing at which the DC-side current of the power converter is detected for every carrier period, so that the plurality of timings is selected uniformly in a predetermined period. The phase current detector 31 corresponds to one example of the processing means.

The power conversion apparatus, the phase current detection apparatus, and the phase current detection method according to this embodiment may be any of the first to eighth power conversion apparatuses, the first phase current detection apparatus, and the first phase current detection method below.

The first power conversion apparatus includes: a power converter that includes a plurality of switching elements and performs power conversion between DC power and three-phase AC power; a switch controller that controls the plurality of switching elements so that the order of outputting a plurality of kinds of voltage vectors from the power converter is opposite in the first half and the latter half of a carrier period; a DC-side current detector that detects a DC-side current of the power converter; and a phase current detector that detects one phase current among three phase currents on the basis of the DC-side current detected by the DC-side current detector at one timing of a first-half timing and a latter-half timing of the carrier period at which the same kind of voltage vector of the plurality of kinds of voltage vectors is output. The phase current detector includes a timing switcher that alternately switches the one timing between the first-half timing and the latter-half timing.

The second power conversion apparatus is the first power conversion apparatus configured such that the phase current detector detects the one phase current among the three phase currents on the basis of the DC-side current detected by the DC-side current detector at the one timing for every carrier period.

The third power conversion apparatus is the first or second power conversion apparatus configured such that the phase current detector detects the DC-side current detected by the DC-side current detector, as a detection value of the one phase current corresponding to the kind of the voltage vector output from the power converter or as a polarity-inverted value of the detection value.

The fourth power conversion apparatus is any of the first to third power conversion apparatuses configured such that the timing switcher alternately switches the one timing between the first-half timing and the latter-half timing in a period that is n times the carrier period (n is a natural number).

The fifth power conversion apparatus is the fourth power conversion apparatus, further including a command generator that generates a voltage command vector. When a region decided on the basis of the voltage command vector is changed, the timing switcher stops to switch the one timing before and after the change on the basis of a relation between the regions before and after the change.

The sixth power conversion apparatus is the fifth power conversion apparatus, configured such that the phase current detector includes a region determiner that determines a region held between two kinds of fundamental voltage vectors with a phase difference of 60° having the voltage command vector interposed therebetween. When a region determined by the region determiner is changed, the timing switcher stops to switch the one timing before and after the change on the basis of a relation between the regions before and after the change.

The seventh power conversion apparatus is any of the first to sixth power conversion apparatuses, the phase current detector including: a timing determiner that determines a central timing of a period for which the voltage vector is output in the one timing; and an acquirer that acquires a detection result of the DC-side current detector at the central timing determined by the timing determiner.

The eighth power conversion apparatus is any of the first to seventh power conversion apparatuses, the phase current detector including: a first detector that detects the one phase current among the three phase currents on the basis of the DC-side current detected by the DC-side current detector for every carrier period at the one timing; a second detector that detects the one phase current among the three phase currents, which is different from the phase current detected by the first detector, on the basis of the DC-side current detected by the DC-side current detector at a timing corresponding to at least one of peak and valley of a carrier in the carrier period; and a third detector that detects the one phase current among the three phase currents, which is different from the phase currents detected by the first detector and the second detector, on the basis of a detection result of the first detector and a detection result of the second detector.

The first phase current detection apparatus includes: a switch controller that controls a plurality of switching elements included in a power converter, which preforms power conversion between DC power and three-phase AC power, so that the order of outputting a plurality of kinds of voltage vectors from the power converter is opposite in the first half and the latter half of a carrier period; a phase current detector that detects one phase current among three phase currents on the basis of a DC-side current of the power converter detected at one timing of a first-half timing and a latter-half timing of the carrier period at which the same kind of voltage vector of the plurality of kinds of voltage vectors is output; and a timing switcher that alternately switches the one timing between the first-half timing and the latter-half timing.

The first phase current detection method includes: controlling a plurality of switching elements included in a power converter, which preforms power conversion between DC power and three-phase AC power, so that the order of outputting a plurality of kinds of voltage vectors from the power converter is opposite in the first half and the latter half of a carrier period; detecting a DC-side current of the power converter for every carrier period at one timing of a first-half timing and a latter-half timing of the carrier period at which the same kind of voltage vector of the plurality of kinds of voltage vectors is output; detecting one phase current among three phase currents on the basis of the detected DC-side current; and alternately switching the one timing between the first-half timing and the latter-half timing.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A power conversion apparatus, comprising:
a power converter comprising circuitry configured to generate a plurality of voltage vectors, detect a DC-side current and convert power between DC power and three-phase AC power; and
a controller comprising processing circuitry configured to control the circuitry of the power converter such that an order of outputting a plurality of voltage vectors from the power converter is opposite in a first half and a second half of a carrier period, calculate one phase current among three phase currents based on the DC-side current detected by the circuitry of the power converter at a detection timing, and alternately switch the detection timing between a first-half timing and a second-half timing,
wherein the detection timing is selected from the first-half timing and the second-half timing of the carrier period at which a same kind of voltage vector of the plurality of voltage vectors is output.

2. The power conversion apparatus according to claim 1, wherein the processing circuitry is configured to calculate the one phase current among the three phase currents based on the DC-side current detected by the circuitry of the power converter at the detection timing for every carrier period.

3. The power conversion apparatus according to claim 1, wherein the processing circuitry is configured to detect the DC-side current detected by the circuitry of the power converter, as a detection value of the one phase current corresponding to a kind of the voltage vector output from the power converter or as a polarity-inverted value of the detection value.

4. The power conversion apparatus according to claim 1, wherein the processing circuitry is configured to alternately switch the detection timing between the first-half timing and the second-half timing in a period that is n times the carrier period where n is a natural number.

5. The power conversion apparatus according to claim 4, wherein the processing circuitry is configured to generate a voltage command vector, and stop switching the detection timing, when a region decided based on the voltage command vector is changed, before and after the region is changed, based on a relation between the region before changed and the region after changed.

6. The power conversion apparatus according to claim 5, wherein the processing circuitry is configured to determine a region held between two kinds of fundamental voltage vectors with a phase difference of 60° having the voltage command vector therebetween, and stop switching the detection timing, when a region determined is changed, before and after the region is changed, based on a relation between the region before changed and the region after changed.

7. The power conversion apparatus according to claim 1, wherein the processing circuitry is configured to determine a central timing of a period for which the voltage vector is output in the detection timing, and acquire a detection result of the DC-side current detected by the circuitry of the power converter at the central timing determined.

8. The power conversion apparatus according to claim 1, wherein the processing circuitry is configured to calculate the one phase current among the three phase currents based on the DC-side current detected by the circuitry of the power converter for every carrier period at the detection timing in a first detection, calculate one phase current among the three phase currents, which is different from the phase current detected by the first detection, based on the DC-side current detected by the circuitry of the power converter at a timing corresponding to at least one of peak and valley of a carrier in the carrier period in a second detection, and calculate one phase current among the three phase currents, which is different from the phase currents detected by the first detection and the second detection, based on a detection result of the first detection and a detection result of the second detection in a third detection.

9. The power conversion apparatus according to claim 2, wherein the processing circuitry is configured to detect the DC-side current detected by the circuitry of the power converter, as a detection value of the one phase current corresponding to a kind of the voltage vector output from the power converter or as a polarity-inverted value of the detection value.

10. The power conversion apparatus according to claim 2, wherein the processing circuitry is configured to alternately switch the detection timing between the first-half timing and the second-half timing in a period that is n times the carrier period where n is a natural number.

11. The power conversion apparatus according to claim 10, wherein the processing circuitry is configured to generate a voltage command vector, and stop switching the detection timing, when a region decided based on the voltage command vector is changed, before and after the region is changed, based on a relation between the region before changed and the region after changed.

12. The power conversion apparatus according to claim 11, wherein the processing circuitry is configured to determine a region held between two kinds of fundamental voltage vectors with a phase difference of 60° having the voltage command vector therebetween, and stop switching the detection timing, when a region determined is changed, before and after the region is changed, based on a relation between the region before changed and the region after changed.

13. The power conversion apparatus according to claim 2, wherein the processing circuitry is configured to determine a central timing of a period for which the voltage vector is output in the detection timing, and acquire a detection result of the DC-side current detected by the circuitry of the power converter at the central timing determined.

14. The power conversion apparatus according to claim 2, wherein the processing circuitry is configured to detect the one phase current among the three phase currents based on the DC-side current detected by the circuitry of the power converter for every carrier period at the detection timing in a first detection, detect one phase current among the three phase currents, which is different from the phase current detected by the first detection, based on the DC-side current detected by the circuitry of the power converter at a timing corresponding to at least one of peak and valley of a carrier in the carrier period in a second detection, and detect one phase current among the three phase currents, which is different from the phase currents detected by the first detection and the second detection, based on a detection result of the first detection and a detection result of the second detection in a third detection.

15. A phase current detection apparatus, comprising:
processing circuitry configured to control a circuitry of a power converter such that an order of outputting a plurality of voltage vectors from the power converter is opposite in a first half and a second half of a carrier period, calculate one phase current among three phase currents based on a DC-side current detected by the circuitry of the power converter at a detection timing, and alternately switch the detection timing between a first-half timing and a second-half timing,
wherein the detection timing is selected from the first-half timing and the second-half timing of the carrier period at which a same kind of voltage vector of the plurality of voltage vectors is output.

16. The phase current detection apparatus according to claim 15, wherein the processing circuitry is configured to calculate the one phase current among the three phase currents based on the DC-side current detected by the circuitry of the power converter at the detection timing for every carrier period.

17. The phase current detection apparatus according to claim 15, wherein the processing circuitry is configured to detect the DC-side current detected by the circuitry of the power converter, as a detection value of the one phase current corresponding to a kind of the voltage vector output from the power converter or as a polarity-inverted value of the detection value.

18. The phase current detection apparatus according to claim 15, wherein the processing circuitry is configured to alternately switch the detection timing between the first-half timing and the second-half timing in a period that is n times the carrier period where n is a natural number.

19. The phase current detection apparatus according to claim 18, wherein the processing circuitry is configured to generate a voltage command vector, and stop switching the detection timing, when a region decided based on the voltage command vector is changed, before and after the region is changed, based on a relation between the region before changed and the region after changed.

20. A method for detecting a phase current, comprising:
controlling circuitry of a power converter such that an order of outputting a plurality of voltage vectors from the power converter is opposite in a first half and a latter half of a carrier period and that power is converted between DC power and three-phase AC power;
detecting a DC-side current of the power converter for every carrier period at a detection timing;
calculating one phase current among three phase currents based on the DC-side current detected; and
alternately switching the detection timing between a first-half timing and a second-half timing,
wherein the detection timing is selected from the first-half timing and the second-half timing of the carrier period at which a same kind of voltage vector of the plurality of voltage vectors is output.

* * * * *